US012765441B2

(12) United States Patent
Horsch et al.

(10) Patent No.: US 12,765,441 B2
(45) Date of Patent: Oct. 20, 2026

(54) AUTONOMOUS AGRICULTURAL CARRIER VEHICLE AND AUTONOMOUS AGRICULTURAL MACHINE

(71) Applicant: HORSCH Maschinen SE & Co. KG, Schwandorf (DE)

(72) Inventors: Philipp Horsch, Schwandorf (DE); Michael Horsch, Schwandorf (DE)

(73) Assignee: HORSCH Maschinen SE & Co. KG, Schwandorf (DE)

( * ) Notice: Subject to any disclaimer, the term of this patent is extended or adjusted under 35 U.S.C. 154(b) by 461 days.

(21) Appl. No.: 18/263,012

(22) PCT Filed: Jan. 24, 2022

(86) PCT No.: PCT/EP2022/051459
§ 371 (c)(1),
(2) Date: Jul. 26, 2023

(87) PCT Pub. No.: WO2022/161904
PCT Pub. Date: Aug. 4, 2022

(65) Prior Publication Data

US 2024/0081170 A1 Mar. 14, 2024

(30) Foreign Application Priority Data

Jan. 26, 2021 (DE) ..................... 10 2021 101 629.0

(51) Int. Cl.
*A01B 73/00* (2006.01)
*A01B 51/02* (2006.01)
(Continued)

(52) U.S. Cl.
CPC ............ *A01B 73/005* (2013.01); *A01B 51/02* (2013.01); *A01B 69/008* (2013.01); *A01B 79/02* (2013.01)

(58) Field of Classification Search
None
See application file for complete search history.

(56) References Cited

U.S. PATENT DOCUMENTS

| | | | | |
|---|---|---|---|---|
| 2017/0164548 | A1* | 6/2017 | Bassett | A01B 69/008 |
| 2019/0235529 | A1* | 8/2019 | Barrick | A01B 23/043 |
| 2020/0221625 | A1* | 7/2020 | Kalverkamp | B62D 49/0635 |

FOREIGN PATENT DOCUMENTS

| | | | |
|---|---|---|---|
| DE | 102012019002 | A1 | 4/2014 |
| DE | 102017007265 | A1 | 2/2019 |

(Continued)

*Primary Examiner* — Christopher J Sebesta
*Assistant Examiner* — Alfred H Tsui
(74) *Attorney, Agent, or Firm* — AVEK IP, LLC; Kent R. Erickson

(57) ABSTRACT

Disclosed is an autonomous agricultural carrier vehicle including a frame construction with mounting devices configured to carry and guide at least one agricultural implement; at least two chassis constructions which are mounted on the frame construction; a drive apparatus having a drive train which is coupled to the least two chassis constructions and is configured to specify a driving speed; and a control apparatus and an environment sensor system which is signal-connected and/or signal-connectable to the control apparatus. The chassis constructions are preferably mounted rotatably about at least 90° about vertically oriented axes. Also disclosed is an autonomous agricultural machine in combination with the autonomous agricultural carrier vehicle.

21 Claims, 9 Drawing Sheets

(51) Int. Cl.
*A01B 69/04* (2006.01)
*A01B 79/02* (2006.01)

(56) References Cited

FOREIGN PATENT DOCUMENTS

| | | | | | |
|---|---|---|---|---|---|
| DE | 102018108025 | A1 | | 10/2019 | |
| WO | 2016087535 | A1 | | 6/2016 | |
| WO | WO-2019193080 | A1 | * | 10/2019 | .......... A01M 7/0089 |

* cited by examiner

AUTONOMOUS AGRICULTURAL CARRIER VEHICLE AND AUTONOMOUS AGRICULTURAL MACHINE

CROSS-REFERENCE TO RELATED APPLICATION

This application claims priority from German patent application No. DE 10 2021 101 629.0 filed Jan. 26, 2021, the disclosure of which is hereby incorporated herein in its entirety by reference.

FIELD

The invention relates to an autonomous agricultural carrier vehicle. The invention furthermore relates to an autonomous agricultural machine combination.

BACKGROUND

Autonomous machine systems are increasingly used in agriculture. Such a machine system has already been disclosed by WO 2016 087 535 A1. The system shown involves a so-called swarm system, i.e. a multiplicity of small machine combinations are used to perform corresponding work processes, wherein in turn greater power should be achieved as a result of the use of several such small machine combinations.

It is disadvantageous, however, in such a swarm system that a plurality of machine combinations are required to achieve a high degree of power, wherein in turn the costs for safety systems to ensure the functional safety of the machine combinations correspondingly also rise as a result of the multiplicity since, irrespective of the size of the machine combination, the requirements in terms of functional safety are sometimes the same. Moreover, the known machine combinations require for road transport an additional transport vehicle which is in turn expensive. A further disadvantage in the case of so-called swarm systems lies in their logistics since these have to be refilled on a frequent basis as a result of the in each case only, for example, small storage tanks for material to be distributed.

SUMMARY

The object of the invention is thus to overcome the described disadvantages of the prior art. In particular, an autonomous agricultural carrier vehicle and/or an autonomous agricultural machine combination should be created, the handling of which is improved.

These objects are achieved by an autonomous agricultural carrier vehicle with the features of independent claim 1 and by an autonomous agricultural machine combination with the features of claim 18. Advantageous embodiments and further developments of the invention are disclosed in the claims and the following description with partial reference to the figures.

According to a first aspect of the invention, an autonomous agricultural carrier vehicle is provided.

The carrier vehicle comprises at least one frame construction, having mounting devices, which are configured to carry and guide at least one agricultural implement.

The carrier vehicle furthermore comprises at least two chassis constructions which are mounted on the frame construction.

The carrier vehicle furthermore comprises at least one drive apparatus having a drive train which is coupled (e.g. operatively connected) to the at least two chassis constructions and is configured to specify a driving speed.

The carrier vehicle furthermore comprises at least one control apparatus and an environment sensor system which is signal-connected and/or signal-connectable to the control apparatus.

In order to create an agricultural carrier vehicle, the handling of which is improved, it is provided according to the invention that the chassis constructions are mounted rotatably about at least 90° in each case about vertically oriented axes.

The invention makes use of the knowledge that, as a result of a rotatable mounting of the chassis constructions and as a result of the use of an environment sensor system, the carrier vehicle can be used for a wide range of purposes and expediently satisfies in each case the requirements in terms of functional safety.

According to one preferred embodiment variant of the invention, it can in particular be provided that the carrier vehicle can be moved in a working direction of travel or a direction of road travel as a function of a 90° rotation of the chassis constructions. Wherein it is alternatively or additionally possible that the working direction of travel and the direction of road travel are substantially orthogonal to one another. Alternatively or additionally, it is possible that the frame construction has a longitudinal extent and the direction of road travel is substantially parallel to the longitudinal extent and the working direction of travel is substantially orthogonal (e.g. substantially perpendicular) to the longitudinal extent.

In order to achieve a carrier vehicle with good driving properties and optimized weight distribution, it can be provided that the carrier vehicle has at least three chassis constructions, preferably at least four chassis constructions, wherein the chassis constructions can be arranged with respect to one another such that connecting lines from each vertically oriented axis to in each case two of the respective vertically oriented axes at the next vertically oriented axis form a substantially rectangular, trapezoidal or triangular base shape.

In order to achieve a carrier vehicle with good driving properties, it is possible that the frame construction extends transversely to the working direction of travel and in the working direction of travel such that it forms a substantially rectangular, trapezoidal or triangular base shape. It should be noted in this regard that a rectangular, trapezoidal or triangular base shape is thus present in particular in a plan view.

In order to achieve a high degree of stability of the frame construction and the respective mounting of the chassis constructions, it can be provided according to a further development of the invention that the frame construction comprises a main carrier construction and an articulation device, wherein the frame construction has at least four side parts which form a base shape which is substantially closed in the working direction of travel and transversely to the working direction of travel. This means that all four side parts are expediently jointly connected by means of at least one connecting strut. Wherein it should be noted in this regard that the connecting strut can in turn be embodied in one piece or several pieces. As a result of the closed base shape, a frame construction is thus made available which corresponds substantially to a self-contained framework.

The frame construction and/or the main carrier construction and the articulation device can have a one-piece or multi-piece structure and be connected, for example, by detachable and/or undetachable connections.

According to the invention, it can expediently in particular be provided that frame construction comprises a main carrier construction and an articulation device, wherein mounting devices can preferably be assigned exclusively to the main carrier construction.

In order to achieve as large as possible an attachment space for the implement to the carrier vehicle, it can be provided that the chassis constructions are mounted on edge regions of the frame construction in such a manner that the frame construction and/or the mounting devices attached to the frame construction have a height distance to a base surface which is at least 0.5 meters or at least 1.0 meters. Alternatively or additionally, it can be provided that the carrier vehicle forms in the working direction of travel a substantially U-shaped and/or V-shaped base shape. Alternatively or additionally, it can furthermore be provided that the carrier vehicle forms transversely to the working direction of travel a substantially U-shaped and/or V-shaped base shape.

In order to also be able to move the carrier vehicle on uneven ground and hereby achieve a simple and low-cost adjustment of the carrier vehicle to uneven surfaces, it can be provided that the frame construction comprises a main carrier construction and an articulation device and that at least two chassis constructions are mounted on the articulation device, wherein the articulation device is mounted pivotably on the main carrier construction by means of a pivot bearing oriented substantially in the working direction of travel. Wherein it is alternatively or additionally to this also possible that the pivot range of the articulation device is limited and/or can be limited with respect to the main carrier construction by means of a limiting apparatus. The limiting apparatus can be formed, for example, by mechanical stops, by actuators or the like. It should be pointed out that a limiting can also comprise complete prevention of pivotability.

According to a further development of the invention, it can be provided that the chassis constructions are mounted in a height-adjustable manner on the frame construction, in particular in such a manner that a height equalization in the case of uneven ground is performed by means of these. Wherein for this purpose, for example, the height adjustment can be performed by means of hydraulically and/or pneumatically and/or electrically operated linear drives (e.g. cylinders) and a height equalization can be performed, for example, with a volumetric flow control and/or pressure control and/or force control known per se.

The carrier vehicle preferably comprises at least two chassis constructions, wherein at least one chassis construction is formed by a single wheel and/or a crawler track and/or by two wheels or two crawler tracks, which two wheels or two crawler tracks can preferably have a twin arrangement and/or tandem arrangement.

One preferred embodiment variant of the invention provides that the carrier vehicle comprises four chassis constructions and one frame construction, which frame construction has a main carrier construction and an articulation device, wherein at least two chassis constructions are mounted on the articulation device and wherein at least two chassis constructions are mounted on the main carrier construction, are preferably mounted on edge regions of the articulation device and the main carrier construction.

In order to achieve a low-cost carrier vehicle having good driving properties, in particular in order to not necessarily have to embody all the chassis constructions to be height-adjustable, it can be provided according to a further development of the invention that the carrier vehicle has at least four chassis constructions which are arranged in the working direction of travel relative to one another in such a manner that they form at least one wheelbase and/or are arranged in the working direction of travel relative to one another in such a manner that they form at least two wheelbases which differ from one another. Alternatively or additionally, it can be provided that the carrier vehicle has at least four chassis constructions which are arranged transversely to the working direction of travel at least largely oppositely in relation to one another such that they form at least one track width and/or are arranged transversely to the working direction of travel such that they have at least two track widths which preferably differ from one another.

It should be pointed out that the track widths relate in each case to consecutively arranged chassis constructions insofar as the chassis constructions are formed by, for example, two wheels and/or crawler tracks, these are considered according to the present document like a traffic lane, wherein in this case the track widths relate in each case to a center of the, for example, two wheels and/or crawler tracks.

According to the invention, it is furthermore provided that the chassis constructions are arranged relative to one another in such a manner that the smaller track width is located at the rear in the working direction or travel and/or the chassis constructions with the small track width are assigned to the articulation device.

It is possible that the carrier vehicle is configured to be moved autonomously in the direction of road travel and/or the working direction of travel and/or to be moved by remote control in the direction of road travel and/or working direction of travel. Wherein, for remote control, it can expediently be provided that the control apparatus comprises an operating unit (e.g. terminal, mobile end unit, remote control and/or the like) or is signal-connected or signal-connectable to such an operating unit.

In order to create a carrier vehicle which satisfies the requirements of functional safety both in a working direction of travel and in a direction of road travel, it can be provided according to a further development of the invention that the control apparatus is configured to provide actuating signals for the drive train based on signals provided by means of the environment sensor system, wherein the environment sensor system is configured to detect obstacles and/or environment data and is arranged on the carrier vehicle in such a manner in order to detect a region upstream of the carrier vehicle in a working direction of travel and/or in order to detect a region upstream of the carrier vehicle in a direction of road travel.

The environment sensor system can for this purpose, for example, be arranged rotatably on the carrier vehicle, for example, be mounted rotatably, for example, about at least 90°. Wherein a rotation can be performed, for example, by means of actuators in an automated manner and/or by remote control and/or manually by an operator.

The environment sensor system can be in each case identical or different in the working direction of travel and in the direction of road travel and in particular be configured to detect identical or different obstacles and/or environment data (e.g. people).

For example, laser scanners and/or camera systems such as, for example, 3D thermal imaging cameras can be used in this case as environment sensor systems. 3D cameras and/or 3D scanners and/or a 3D rig can also be used. Infrared sensors could correspondingly also be used. In particular, in each case two environment sensor systems are used. The two environment sensor systems can also detect different objects so that a joint image can be determined by means, for example of a control apparatus in turn on this basis. It can thus also be provided that the two environment sensor systems have different physical measurement properties or can detect different physical properties.

On the basis of the, for example, different physical properties or on the basis of the object properties detected by means of the environment sensor system, an evaluation of the type of obstacle and/or element can subsequently be performed. The type can be in this case, for example, an evaluation of a living being or plant. But also above the obstacle and/or element by means of the carrier vehicle can/may be driven over or not, i.e. if it involves, for example, a small plant, it can be driven over, but if it is a living being it may not be driven over.

It can furthermore be provided that nominal values for the type of obstacle and/or element determined by the environment sensor system are stored in the control apparatus. For example, temperature requirements can be stored on the basis of which the evaluation is performed as to whether it involves living beings or plants. Movement parameters can also be stored so that in turn, on the basis of a defined movement, an evaluation is performed as to whether it involves living beings or plants. Contour parameters can also be stored by means of which, for example, an evaluation can be performed as to which type of living being or plant this involves, in particular the size of the obstacle and/or element.

The environment sensor system can alternatively or additionally also be signal-connected and/or signal-connectable to sensors of a, for example, unmanned flying object (e.g. drone).

In order to achieve a defined movement and/or steerability of the carrier vehicle, it is possible that the at least two chassis constructions coupled to the drive train, based on actuating signals provided by means of the control apparatus, can be driven in a working direction of travel with the same driving speeds or with different driving speeds. Alternatively and/or additionally, it is possible that the at least two chassis constructions coupled to the drive train, based on actuating signals provided by means of the control apparatus, can be driven in a direction of road travel with the same driving speeds or with different driving speeds or can be operated in idle mode. The idle mode is used in particular in this case if the carrier vehicle is pulled in a direction of road travel by means of a tractor, i.e. is expediently not moved autonomously or by remote control.

In order to achieve a flexible movement of the carrier vehicle, it is possible that at least one chassis construction, preferably all the chassis constructions, is/are mounted in a freely rotatable manner about the vertically oriented axis with respect to a working direction of travel and/or with respect to a direction of road travel. Alternatively or additionally, it is possible that, in order to achieve a steerability of the carrier vehicle, at least one chassis construction, preferably all the chassis constructions, is/are actively steerable by means of a steering drive (e.g. steering cylinder, steering rod or the like) with respect to a working direction of travel and/or with respect to a direction of road travel about the vertically oriented axis, wherein the control apparatus is configured to provide actuating signals for the steering drive.

According to a further embodiment variant, it can be provided that the carrier device should be moved along a defined movement route or driving route which can be specified, for example, by means of a planning program (e.g. track planning tool). In order to be able to adhere to this movement route and detect and suppress in particular lateral yaw and pitching movements or snaking movements of the carrier vehicle and/or of the implement mounted on the carrier vehicle, it can be provided according to a further development of the invention that at least one chassis construction, preferably at least two or all chassis constructions, is/are actively steerable by means of a steering drive (e.g. steering cylinder) about the vertically oriented axis with respect to a working direction of travel and/or with respect to a direction of road travel, wherein the control apparatus is configured to provide actuating signals for the steering drive, wherein the control apparatus is signal-connected and/or signal-connectable to at least two position determination systems arranged spaced apart from one another preferably transversely to the working direction of travel and is configured to determine a difference between a current position of the carrier vehicle and/or an implement coupled to the carrier vehicle on agricultural land and a nominal position and provide actuating signals for the drive train and/or for the steering drive based on a difference. Therefore, if, for example, snaking movements occur, these can be detected by the position determination systems arranged spaced apart from one another and subsequently steering movements can be performed in order to counteract these snaking movements.

The position determination system(s) can be formed by satellite-supported position determination systems (e.g. GPS systems), alternatively or additionally the position determination system can also be formed by, for example, sensors which are configured, for example, for lane detection, for example, laser scanners can be used, for example, for such sensors. A so-called geo-fencing system could also be used. A combination of the above-mentioned position determination systems would also be conceivable.

It should be noted the vertical axis can, for example, be oriented perpendicular to the working direction of travel, but also can be vertically oriented with respect to the working direction of travel and can correspondingly form a steering angle.

The drive apparatus can be formed, for example, by one or more electric motors, internal combustion engines and/or the like. The drive train can furthermore comprise a wide range of components which are configured to transmit a movement force to the chassis constructions.

The mounting device can be formed, for example, by bolt connections, plug-in connections, screw connections, fast-closure connections and/or the like.

It should be pointed out that specifying can also according to the invention comprise defining, calculating, generation and/or the like.

Providing can likewise according to the invention also comprise defining, calculating, generating and/or the like.

The control apparatus has, for example, a computer unit, an on-board computer and/or the like and furthermore comprises an open-loop and/or closed-loop control circuit, in particular a hydraulic and/or pneumatic and/or electrical open-loop and/or closed-loop control circuit, wherein the open-loop and/or closed-loop control circuit is expediently formed for hydraulic and/or pneumatic and/or electrical signal and/or command transmission. Which signal and/or command transmission can also be performed wirelessly (e.g. by means of WLAN). The control apparatus also comprises a corresponding open-loop and/or closed-loop control program.

In the context of the invention, the term control apparatus comprises in particular the entirety of the components for signal and/or command transmission. Correspondingly also computer units, CPUs and/or the like. Control apparatuses integrated in the respective sensors or sensor units or sensor arrangements are likewise also correspondingly encompassed. It should also be pointed out that the signals and/or data of the sensors/measuring apparatuses/detection apparatuses and/or the like can be used in each case as feedback for an open-loop and/or closed-loop control variable.

It should be pointed out that the terms "open-loop control" and "closed-loop control" and "control apparatus" can relate to electronic and/or pneumatic and/or hydraulic open-loop and/or closed-loop controls which, depending on the formation, can take on open-loop tasks and/or closed-loop tasks. Even if the term "open-loop control" is used herein, this can expediently also encompass "closed-loop control". Likewise, when using the term "closed-loop control", "open-loop control" can equally also be thus encompassed.

To avoid repetition, features disclosed in conjunction with the autonomous agricultural carrier vehicle should also be regarded as disclosed for an autonomous agricultural machine combination and be capable of being claimed. The above-mentioned aspects and features and embodiments according to the invention, in particular in relation to the carrier vehicle, thus also apply to the machine combination and can be combined with one another freely and in any desired manner. The reverse applies such that all aspects, features according to the invention and embodiment variants which are disclosed in conjunction with the machine combination accordingly are also disclosed for the carrier vehicle and can correspondingly be claimed.

In order to achieve the objects, the invention furthermore comprises an autonomous agricultural machine combination. The machine combination comprises an autonomous agricultural carrier vehicle as is described in this document, in particular an autonomous agricultural carrier vehicle as claimed in any one of claims 1 to 17.

According to the invention, it is provided that an agricultural implement with at least one agricultural working tool is coupled to the carrier vehicle, wherein the working tool is configured to perform an agricultural work process (e.g. distribution of material to be distributed, soil cultivation, harvesting and/or the like).

The implement can, or the working tools can, according to the invention be embodied in various manners. For example, as a field sprayer and/or fertilizer spreader so that, for example, a spray rod and/or a distribution rod can be attached to the carrier construction and the working tools can be embodied, for example, as spray nozzles and/or impact elements and/or the like. Implements in the form of soil cultivation devices would also be conceivable.

It is likewise conceivable that various open-loop and/or closed-loop control programs for providing actuating signals for, for example, the drive train are stored in the control apparatus and the control apparatus is furthermore configured to select a required open-loop and/or closed-loop control program as a function of the respective implement.

Open-loop and/or closed-loop control programs can in turn also be stored for corresponding working tools and in turn the required open-loop and/or closed-loop control program can be selected as a function of the working tool used. Wherein the selection can be performed, for example, in an automated manner by a coding system assigned to the implement and the carrier vehicle and/or can be performed manually by an operator.

According to a further development of the invention, it can be provided that the implement has a maximum working width oriented transversely to the working direction of travel and the implement is arranged with respect to the carrier vehicle in such a manner that it has a minimum protrusion region with respect to at least two sides of the frame construction and/or the in each case furthest outwardly lying vertical axis, wherein the minimum protrusion region is at least 10%, preferably at least 15% or at least 20% of the maximum working width. It can in particular be provided that the minimum protrusion region is located opposite at least two non-parallel sides of the substantially trapezoidal or substantially triangular base shape of the frame construction.

According to a further development of the machine combination according to the invention, it can be provided that it has, in a working direction of travel, a maximum working width defined by the implement and oriented transversely to the working direction of travel and has, in a direction of road travel, a minimum transport width defined by the carrier vehicle and oriented transversely to the direction of road travel. Wherein the maximum working width is greater than the minimum transport width, preferably twice as large, or at least three times as large, or at least four times as large as the minimum transport width.

In this case, the maximum working width can preferably be at least 9 meters, or at least 12 meters or at least 15 meters or at least 18 meters or more. The carrier vehicle can correspondingly have a maximum vehicle width of at most 3 meters or at most 4 meters or at most 5 meters transversely to the working direction of travel. The machine combination can furthermore have a minimum transport width of at most 2.5 meters or at most 3 meters or at most 4 meters or at most 5 meters.

According to an alternative or additional embodiment variant, it can furthermore be provided that the implement is arranged between at least two chassis constructions arranged consecutively in the working direction of travel preferably in such a manner that the chassis constructions are rotatable by means of the vertically oriented axes at a pivot angle of at least 180° or at least 225° or at least 270°, are rotatable in particular at least about approximately 360°.

An improved mounting of the implement on the carrier vehicle can, according to a further development of the invention, in particular be achieved in that the implement, in particular the at least one agricultural working tool, is mounted with its entire height extent below the frame construction.

In order to achieve optimized weight distribution of the machine combination, it is possible according to a further development of the invention that the work process to be performed by means of the machine combination comprises a distribution of agricultural material to be distributed, and that a storage container for storing and carrying agricultural material to be distributed is assigned to the carrier vehicle, wherein the working tools assigned to the implement are preferably formed as distribution apparatuses and are configured to distribute the agricultural material to be distributed in the required manner on an agricultural area, and wherein the storage container is operatively connected to the distribution apparatuses by means of connecting lines.

It is alternatively or additionally also possible that at least one sensor of the environment sensor system is spatially and/or structurally assigned to the implement and is signal-connected and/or signal-connectable to the control apparatus, wherein the control apparatus is configured to provide actuating signals for the drive train based on signals of the sensor, assigned to the implement, of the environment sensor system.

BRIEF DESCRIPTION OF THE DRAWINGS

Further details and advantages of the invention are described below with reference to the enclosed drawings.

The size ratios of the individual elements in relation to one another in the figures do not always correspond to the real size ratios since some shapes are simplified and other shapes are enlarged for the purpose of illustration in comparison with other elements. In the figures.

DETAILED DESCRIPTION

Figure 1:
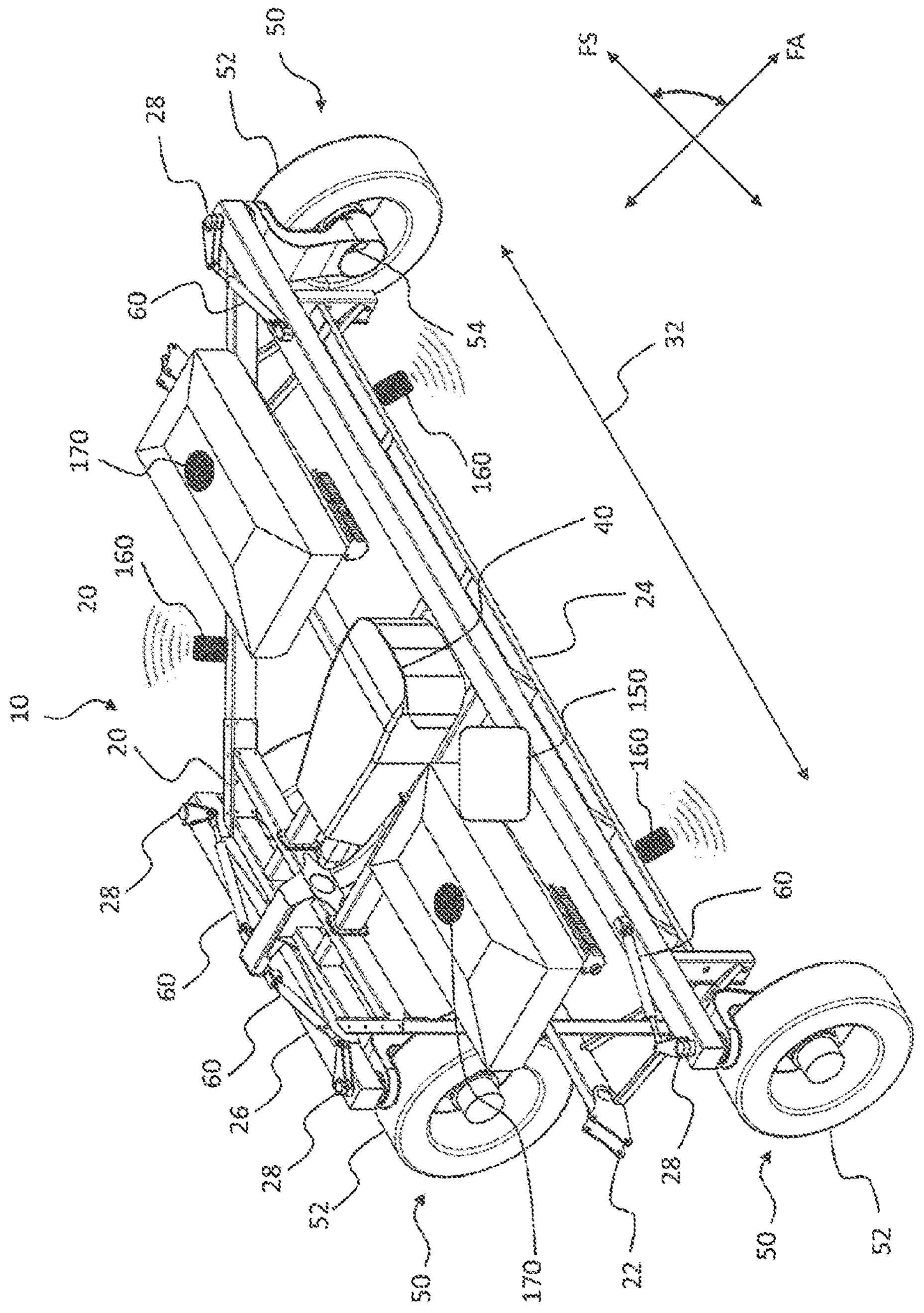
FIG. 1 shows a perspective view of an embodiment variant represented in a highly simplified manner of an autonomous agricultural carrier vehicle according to the invention.
Figure 2:
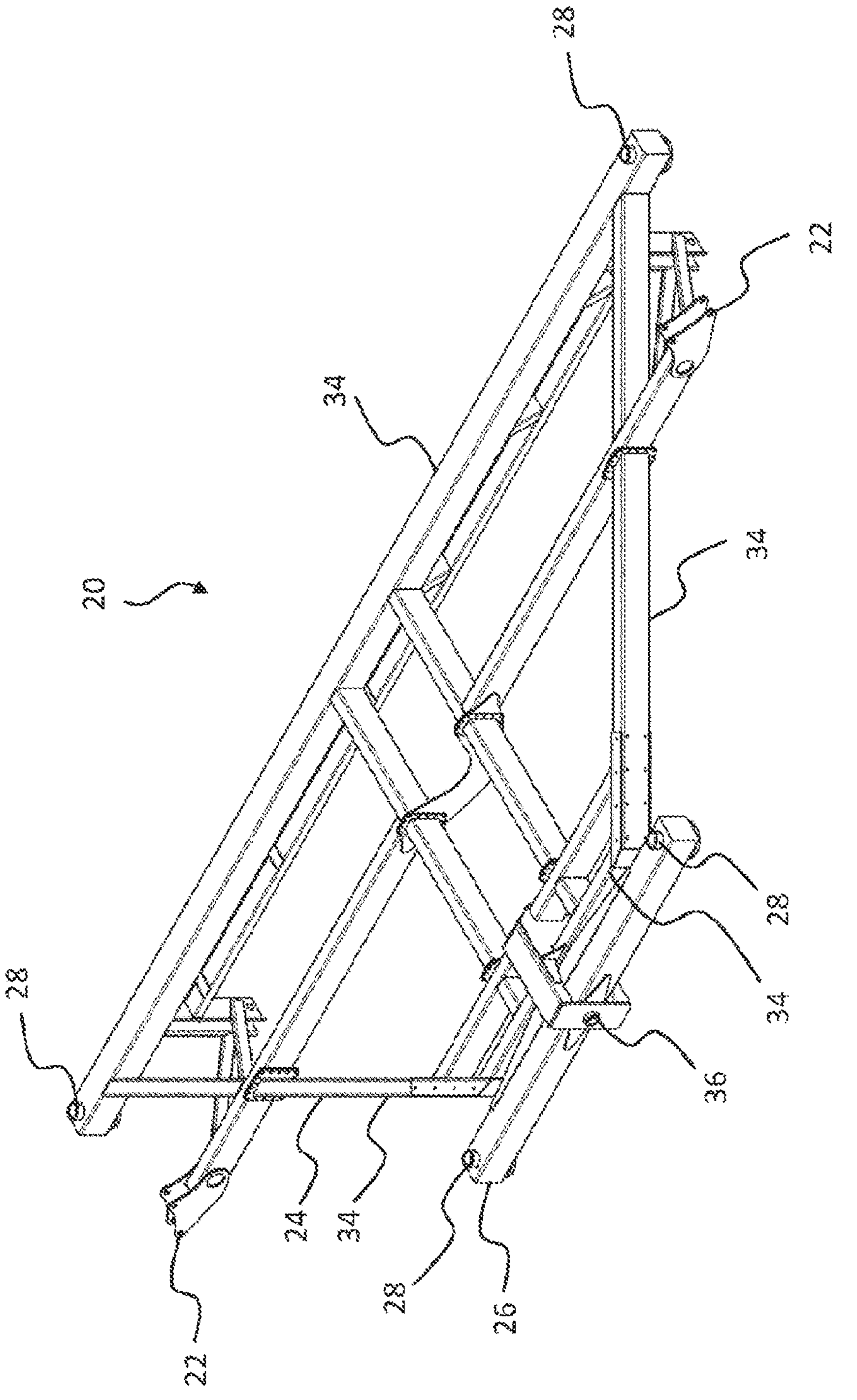
FIG. 2 shows a perspective view of an embodiment variant of a frame construction with a main carrier construction and an articulation device.

The embodiments shown in FIGS. 1 to 3 correspond at least partially, hence similar or identical parts are provided with the same reference numbers and for the explanation of which reference is also made to the description of other embodiments or figures in order to avoid repetition. The represented embodiments only represent examples of how the autonomous agricultural carrier vehicle according to the invention and the autonomous agricultural machine combination according to the invention can be configured and embodied and do not represent a conclusive restriction.

FIG. 1 shows a perspective view of an embodiment variant, represented in a highly simplified manner, of an autonomous agricultural carrier vehicle 10 according to the invention.

The carrier vehicle 10 comprises at least one frame construction 20 with mounting devices which are configured to carry and guide at least one agricultural implement 100 (see FIG. 3).

The carrier vehicle 10 furthermore comprises a drive apparatus 40 in the form of a drive motor, wherein the drive motor can be formed, for example, as an internal combustion engine, however, alternatively, can also be formed as an electric motor or as a hybrid motor.

The carrier vehicle 10 furthermore comprises a drive train (not represented here) which is coupled (e.g. operatively connected) to at least two chassis constructions 50 and is in particular configured to specify a driving speed of the carrier vehicle 10. The drive train can be embodied in this case in a manner known per se.

The carrier vehicle 10 according to the exemplary embodiments comprises in each case four chassis constructions 50 which are mounted on the frame construction 20, but two or three chassis constructions 50 would also be conceivable, but five or more chassis constructions 50 would also be conceivable.

The carrier vehicle 10 furthermore comprises a control apparatus 150 and an environment sensor system 160 which is signal-connected and/or signal-connectable to the control apparatus. Wherein the environment sensor system 160 according to FIG. 1 is formed by three schematically represented sensors.

Figure 3A:
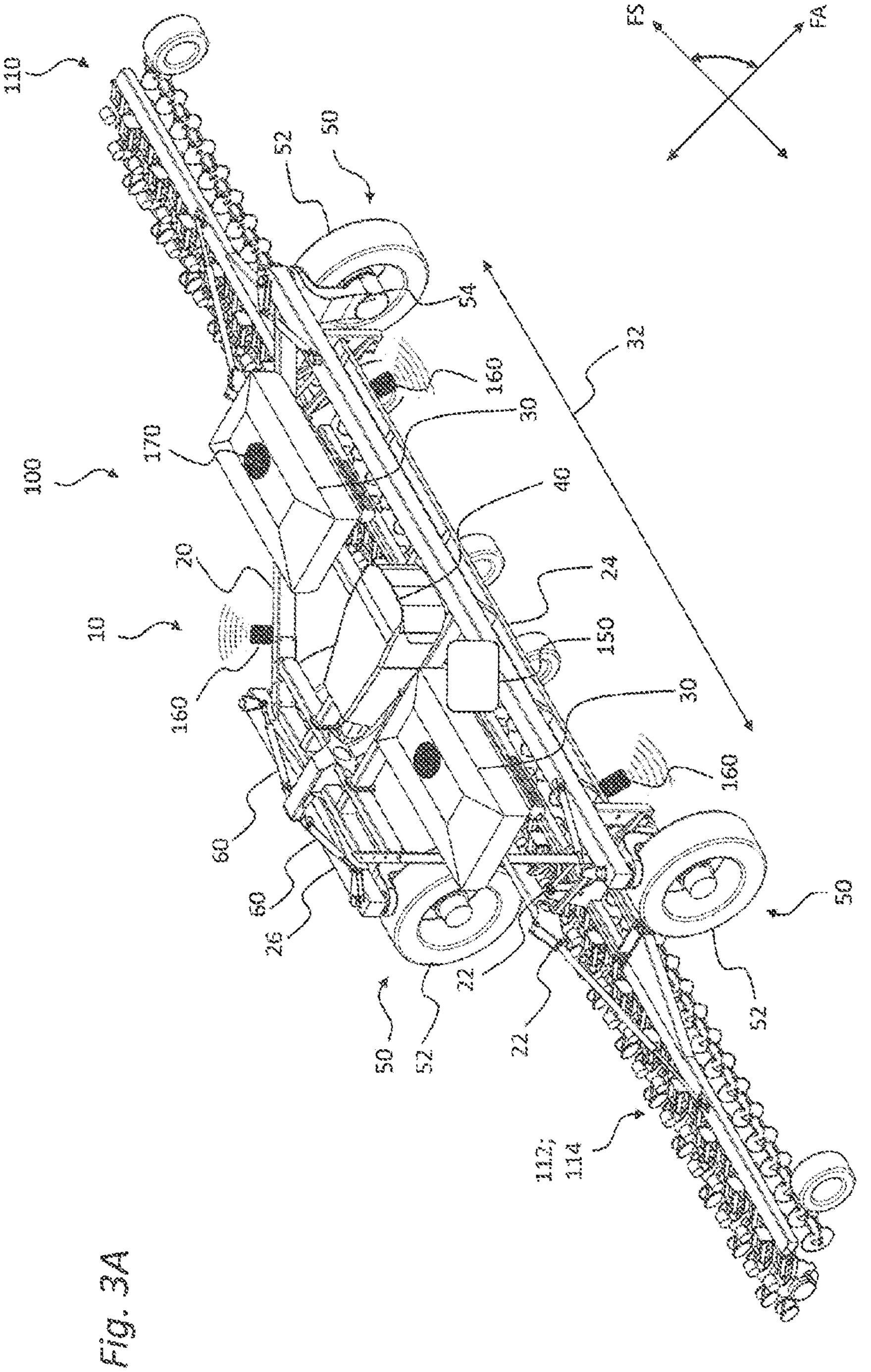
FIGS. 3A, 3B, 3C, 3D, 3E, 3F, 3G, and 3H depict various perspective views, plan views and side views of an embodiment variant of an autonomous agricultural machine combination.
Figure 3B:
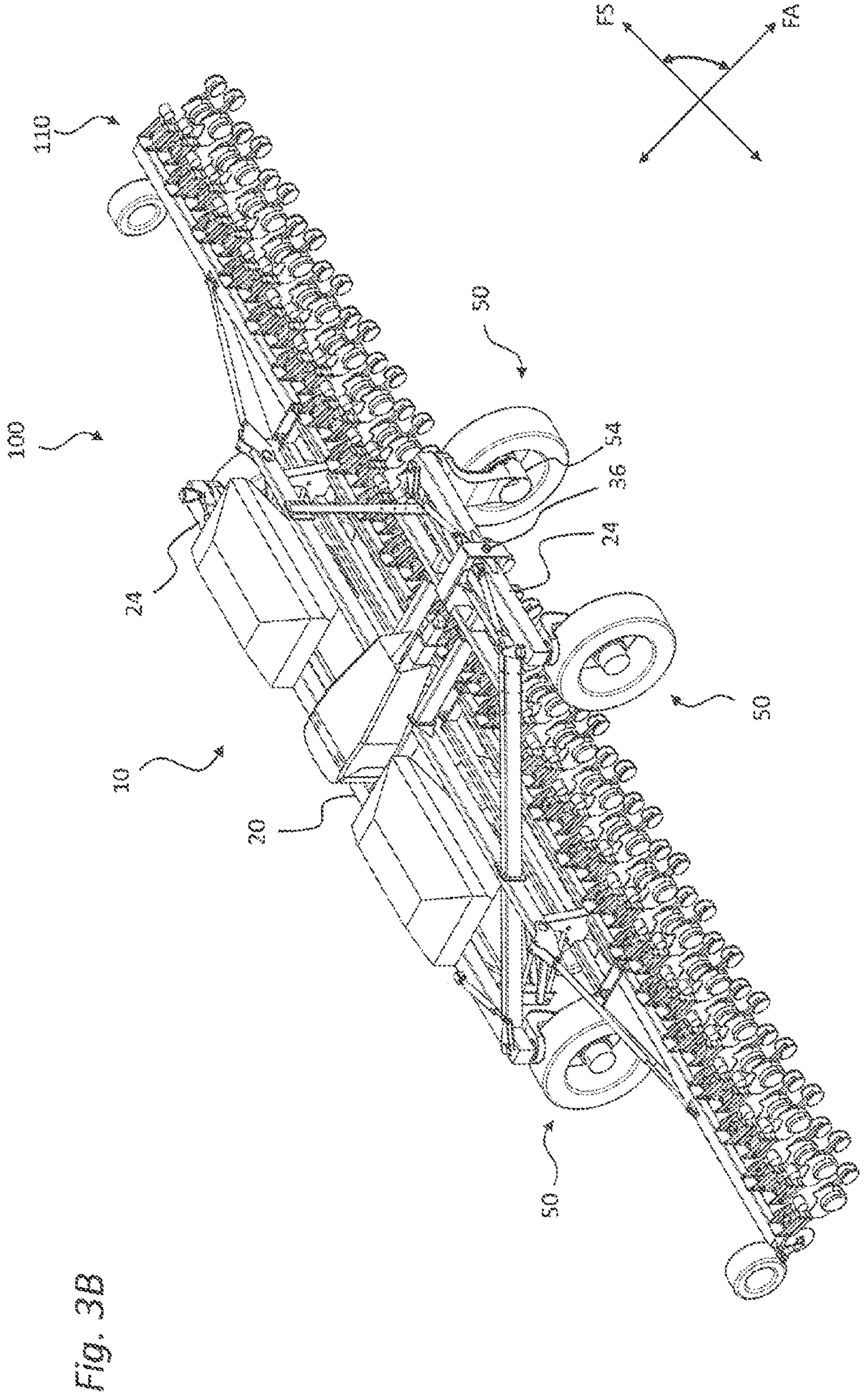
Figure 3C:
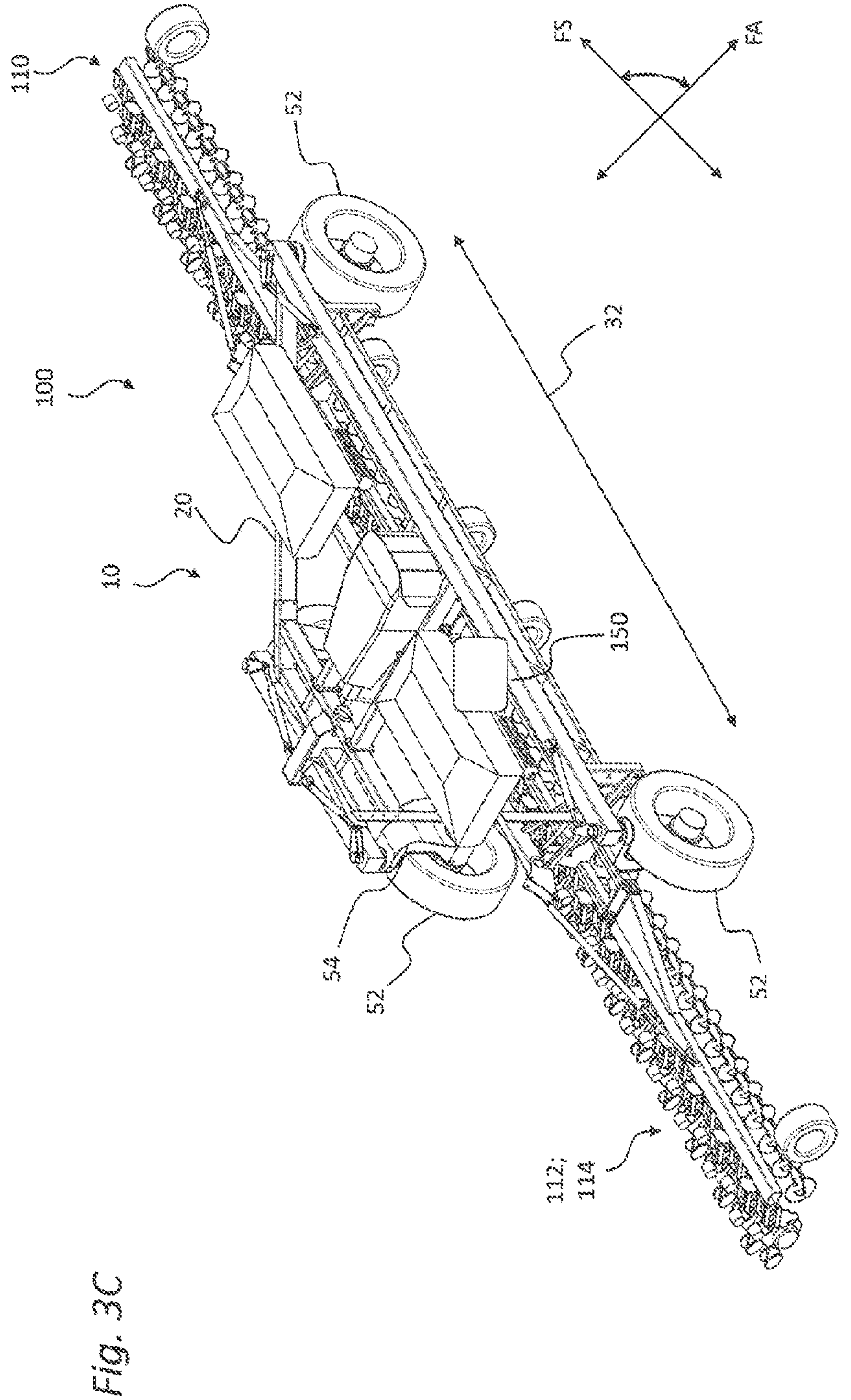
Figure 3D:
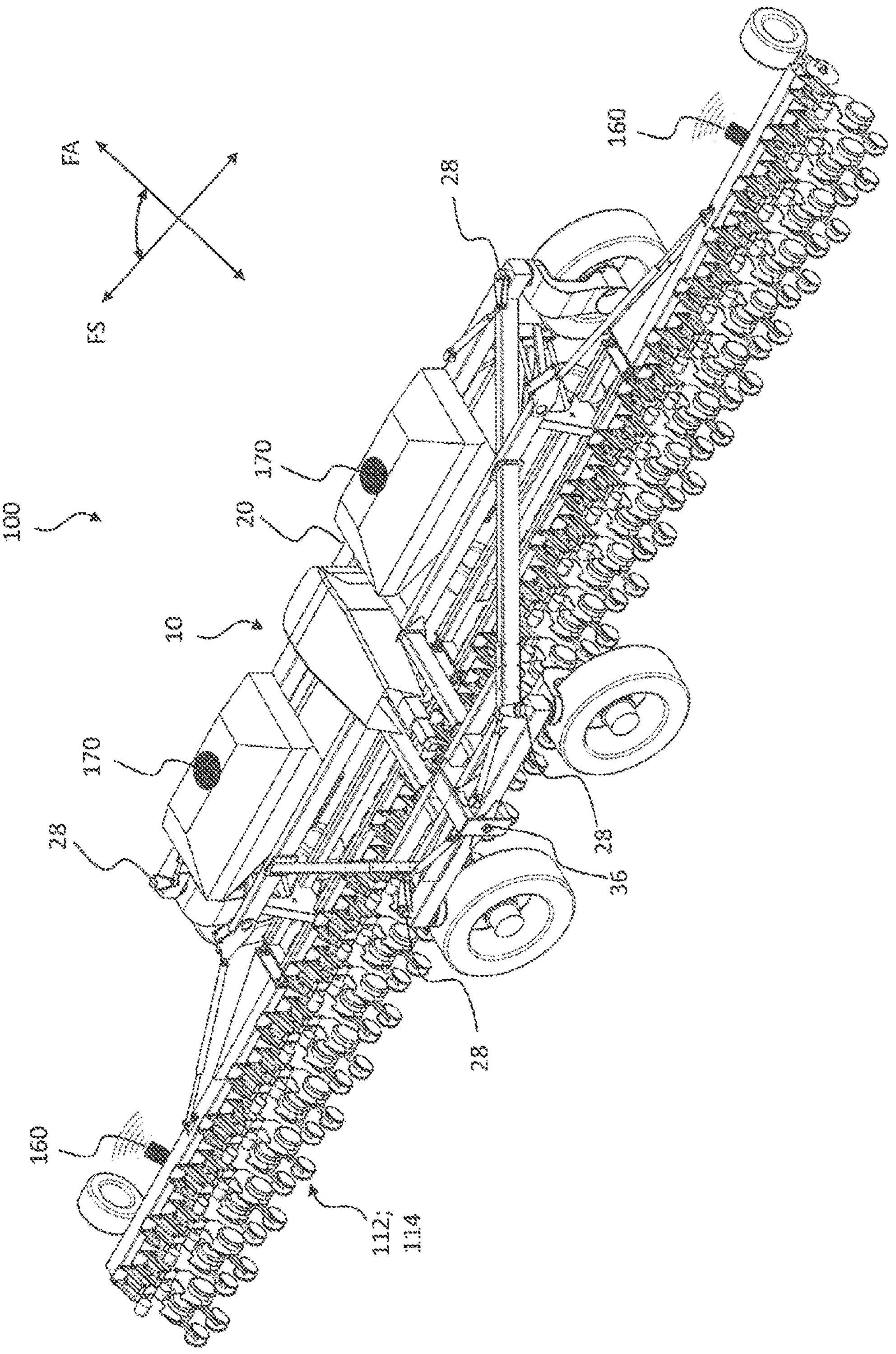
Figure 3E:
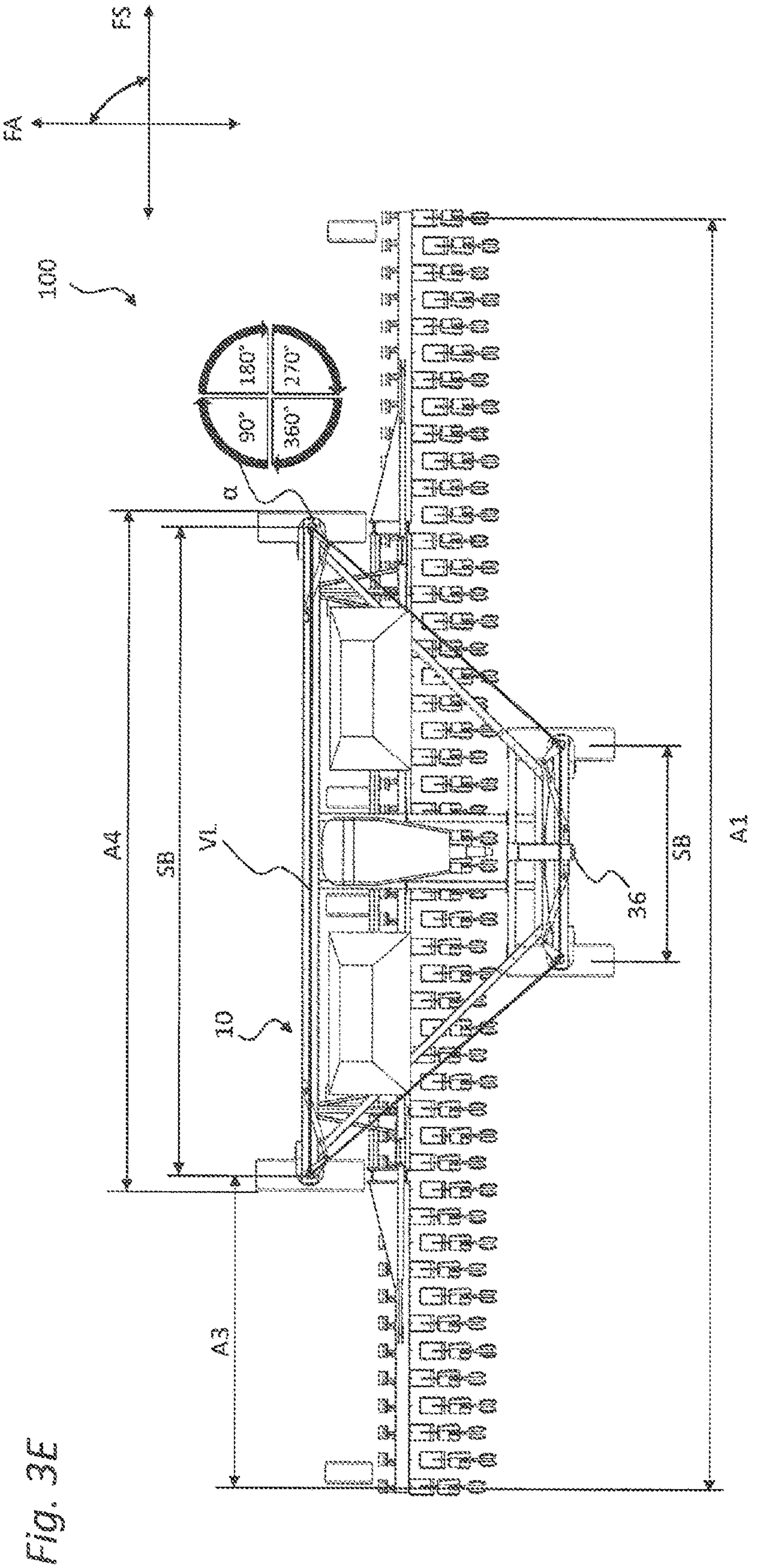
Figure 3F:
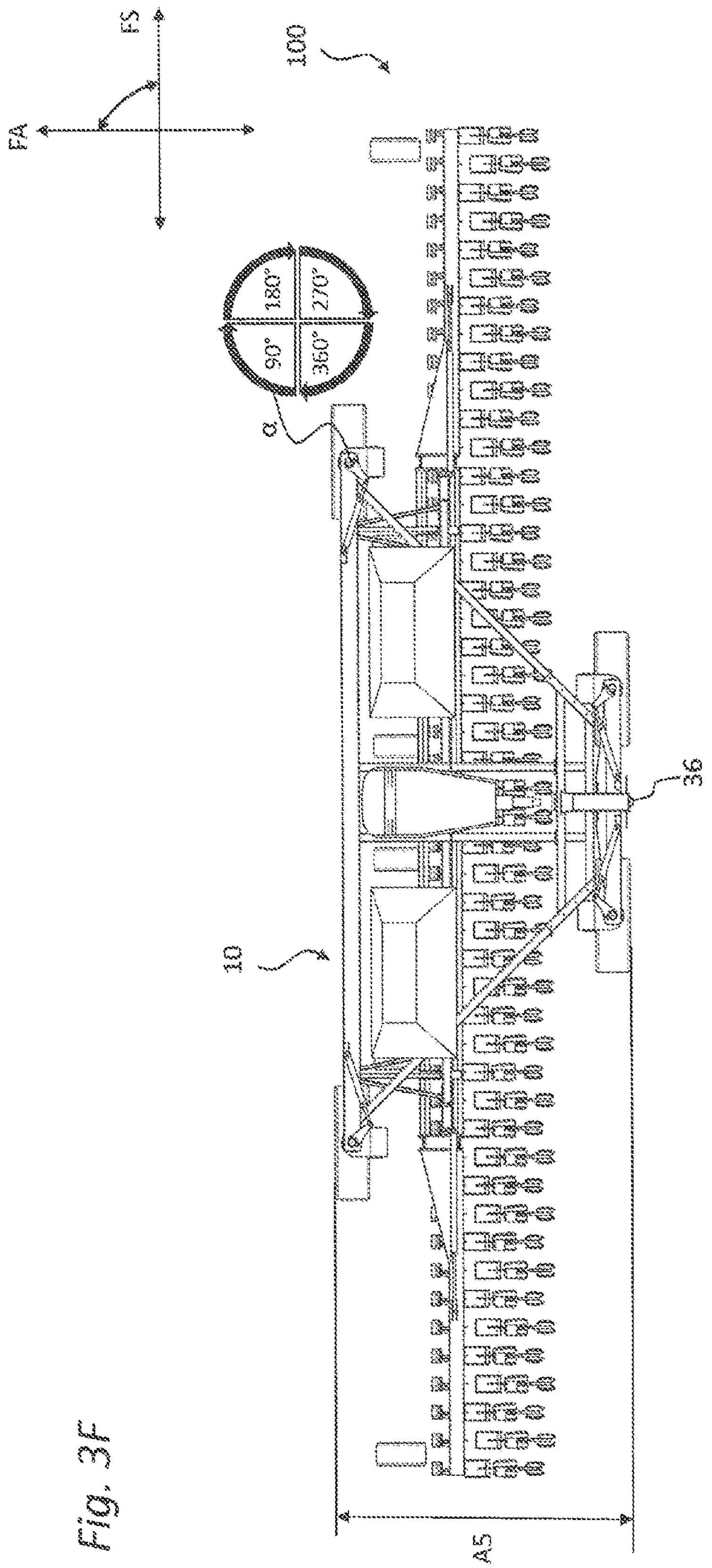

The carrier vehicle 10 provides according to the invention that the chassis constructions 50 are mounted rotatably about at least 90° about vertically oriented axes 28 (cf. in this regard FIG. 1 and, for example, 3C or FIGS. 3E and 3F).

In order to enable good driving properties of the carrier vehicle, it is provided according to the exemplary embodiments that the carrier vehicle 10 has four chassis constructions 50, wherein the chassis constructions 50 are arranged with respect to one another such that connecting lines VL from each vertically oriented axis 28 to in each case two of the respective vertically oriented axes 28 at the next vertically oriented axes 28 form a substantially trapezoidal base shape. A substantially square or rectangular base shape would, however, also be possible. The use of only three chassis constructions would also be possible and thus a substantially triangular base shape. Wherein the connecting lines VL are plotted schematically in a plan view of FIG. 3E for the purpose of better understanding.

The articulation device 26 is mounted on the main carrier construction 24 by means of a pivot bearing 36 oriented substantially in the working direction of travel FA. Wherein it is possible that the pivot range of the articulation device is limited and/or can be limited with respect to the main carrier construction 24.

According to the exemplary embodiments of FIGS. 1 to 3, the chassis constructions 50 are formed in each case by a single wheel 52, which single wheel 52 is mounted rotatably on the vertically oriented axis 28 by means of a wheel suspension 54. It would e.g. also be possible in this case that the drive train has a wheel motor which is coupled to at least two of the four single wheels 52. Other types of drives for the single wheels would also be conceivable and usable.

According to an alternative or additional embodiment variant, it would also be conceivable that the chassis construction 50 is formed by a crawler track and/or by two wheels or two crawler tracks, which two wheels or two crawler tracks preferably have a twin arrangement and/or tandem arrangement.

The wheel suspension 54 is embodied not to be adjustable in terms of its height position, but height-adjustable wheel suspensions 54 would also be conceivable.

The carrier vehicle 10 according to the exemplary embodiments comprises four chassis constructions 50 and a frame construction 20 with a main carrier construction and an articulation device 26, wherein at least two chassis constructions 50 are mounted on the articulation device 26 and wherein at least two chassis constructions 50 are mounted on the main carrier construction 24, preferably on edge regions of the articulation device 26 and the main carrier construction 24.

The chassis constructions 50, or the single wheels 52 of the carrier vehicle 10 are arranged relative to one another in such a manner that they in a working direction of travel FA form a wheelbase RS (see, for example, FIG. 3G), wherein it is also conceivable that these are arranged in such a manner that they form at least two or more wheelbases RS which differ from one another.

Moreover, the chassis constructions 50, or the single wheels 52 of the carrier vehicle 10 are arranged relative to one another at least largely oppositely transversely to the working direction of travel Fa in such a manner that they have at least two track widths SB which preferably differ from one another (see, for example, FIG. 3F). Wherein an arrangement would also be conceivable in which only one track width SB is generated.

It should be pointed out the track widths SB relate in each case to consecutively arranged chassis constructions 50 in the working direction of travel insofar as the chassis constructions 50 are formed by, for example, two wheels 52 and/or crawler tracks, these are considered according to the present document like a traffic lane, wherein in this case the track widths SB relate in each case to a center of the, for example, two wheels and/or crawler tracks.

According to the invention, it is furthermore provided that the chassis constructions 50 are arranged relative to one another in such a manner that the smaller track width SB is located at the rear in the working direction of travel FA and/or the chassis constructions 50 with the smaller track width SB are assigned to the articulation device 26.

FIG. 2 shows a perspective view of an embodiment variant of a frame construction 20 as is used, for example, in the carrier vehicle 10 according to FIG. 1. The frame construction 20 is composed of a main carrier construction 24 and an articulation device 26. Wherein the mounting devices 22 are expediently assigned exclusively to the main carrier construction 24.

As is apparent from FIG. 2 and FIG. 3E, the base shape of the frame construction 20 is adapted to the arrangement of the chassis constructions 40, as a result of which according to the exemplary embodiments the frame construction 20 also forms a substantially trapezoidal base shape. Wherein it should be noted in this regard that the trapezoidal base shape is present in the plan view.

The frame construction 20 according to the exemplary embodiments comprises a main carrier construction 24 and an articulation device 26. The frame construction 20 furthermore has at least four side parts 34 which form a closed base shape in the working direction of travel FA and in the direction of road travel FS. Wherein the side parts 34 are, however, also embodied in several parts.

The frame construction 20, expediently the main carrier construction 24 and the articulation device 26 are constructed in each case in multiple parts and are connected in each case by detachable connections (e.g. screw connection) and undetachable connections (e.g. welding).

The mounting device 22 according to the exemplary embodiments are embodied as bolt connections, but alternatively or additionally plug-in connections, screw connections, fast-closure connections and/or the like could also be used.

FIGS. 3A to 3H show different views of exemplary embodiments of an autonomous agricultural machine combination 100 which are described with joint reference to FIGS. 3A to 3H.

The machine combination can be moved in a drive direction of travel FA (see FIGS. 3A; 3B; 3E; 3G) or in a direction of road travel FS (see FIGS. 3C; 3D; 3F; 3H), wherein a direction of travel FA; FS is defined in each case by a position of the chassis constructions 50. FIGS. 3A; 3B; 3C; 3D furthermore show in each case a perspective view, FIGS. 3E and 3F in each case a plan view, and FIGS. 3G and 3H in each case a side view of the machine combination.

The autonomous agricultural machine combination 100 comprises an autonomous agricultural carrier vehicle 10 as is described in this document, in particular an autonomous agricultural carrier vehicle 10 as claimed in any one of claims 1 to 17.

The machine combination 100 furthermore comprises an agricultural implement 110 with at least one agricultural working tool 112, wherein the working tool 112 is configured to perform an agricultural work process. The implement 110 according to the exemplary embodiments is embodied as a distribution machine in the form of a seed drill, expediently single grain machine, wherein the working tools are correspondingly embodied as a single grain sowing coulter. Other implements 110 or working tools would, however, also be conceivable, for example, sprayers (e.g. with spraying rods), fertilizer spreaders (e.g. with distribution rods), harvesting machines, soil cultivation devices and/or the like.

The implement 110 expediently has a maximum working width A1 oriented transversely to the working direction of travel FA, wherein the implement 110 is arranged with respect to the carrier vehicle 10 in such a manner that it has a minimum protrusion region A3 with respect to at least two sides of the frame construction 20, preferably with respect to at least two non-parallel sides of the substantially trapezoidal base shape of the frame construction and/or the in each case furthest outwardly lying vertical axis 28, wherein the minimum protrusion region A3 is at least 10%, preferably at least 15% or at least 20% of the maximum working width A1. This means, for example, that the maximum working width A1 or A2 is, for example, 12 meters and the minimum protrusion region A3 is thus at least 1.2 meters on both sides, preferably at least 1.8 meters or at least 2.4 meters, wherein in this case the maximum vehicle width A4 of the carrier vehicle is at most 9.6 meters, preferably at most 8.4 meters or at most 7.2 meters.

As is apparent from the exemplary embodiments, the implement 110 has a maximum working width A1 oriented transversely to the working direction of travel FA (and thus in the direction of road travel) and in a direction of road travel FS a minimum transport width A5 defined by the carrier vehicle 10 and oriented transversely to the direction of road travel FS (and thus in the working direction of travel). As is apparent from the exemplary embodiments, the maximum working width A1 is greater than, expediently multiple times greater than the minimum transport width A5, preferably at least twice as large, or at least three times as large, or at least four times as large.

As is apparent from FIGS. 3E to 3H, the implement 110 is arranged between at least two chassis constructions 50 arranged behind one another in the working direction of travel FA. According to the exemplary embodiments in such a manner that the chassis constructions 50 are rotatable by means of the vertically oriented axes 28 at a pivot angle $\alpha$ of at least 180° or at least 225° or at least 270°, are rotatable in particular at least about approximately 360°. Wherein it should be noted in this regard that the pivot angle $\alpha$ in a working direction of travel FA or a direction of road travel FS can assume any desired value which lies within the predefined maximum pivot angles $\alpha$, in particular to perform, for example, steering movements.

As is furthermore apparent from the exemplary embodiments of FIG. 3, the implement 110, in particular the at least one working tool 112 of the implement 110, is mounted with its entire height extent below the frame construction 20.

The machine combination 100 according to the exemplary embodiments serves in particular to distribute agricultural material to be distributed, in particular seeds, fertilizer or the like, i.e. a distribution of seeds, fertilizer or the like can be executed as a work process with the machine combination 100. Wherein a storage container 30 for storing and carrying agricultural material to be distributed is assigned, in particular spatially and structurally, to the carrier vehicle 10. Wherein the storage container 30 can expediently be operatively connected to distribution apparatuses 114 of the implement 110 by means of connecting lines (e.g. hoses, tubes or the like).

In order to comply with the requirements in terms of functional safety, it is furthermore provided according to the exemplary embodiments that at least one sensor, or two or more sensors of the environment sensor system 160 is/are spatially and/or structurally assigned to the implement 110 and is signal-connected and/or signal-connectable to the control apparatus 150, wherein the control apparatus 150 is configured to provide actuating signals for the drive train based on signals of the sensor, assigned to the implement 110, of the environment sensor system 160.

As is expediently apparent from FIGS. 3, it is provided according to the invention that the carrier vehicle can be moved in a working direction of travel FA or a direction of road travel FS as a function of a 90° rotation of the chassis constructions 50. Wherein, according to the exemplary embodiments, the working direction of travel FA and the direction of road travel FS are arranged substantially orthogonally to one another. Moreover, according to the exemplary embodiments, the frame construction 20 has a longitudinal extent 32 and the direction of road travel FS is substantially parallel to the longitudinal extent 32 and the working direction of travel FA is substantially orthogonal (e.g. perpendicular) to the longitudinal extent 32.

Figure 3H:
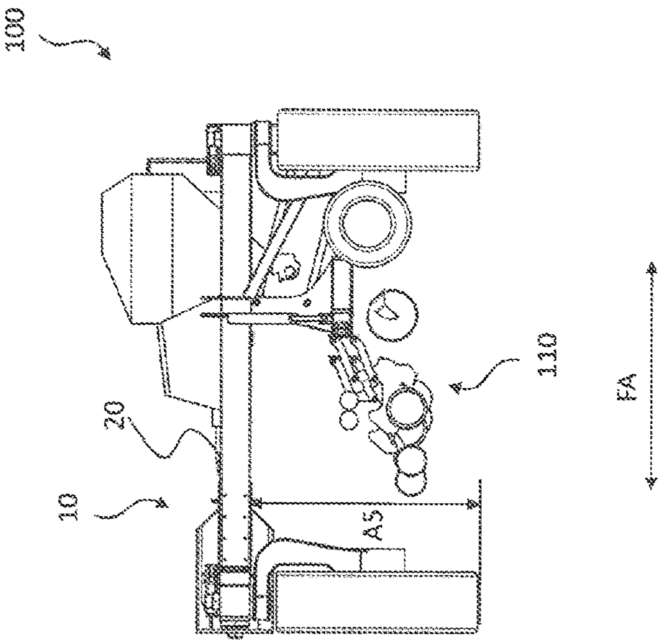
Figure 3G:
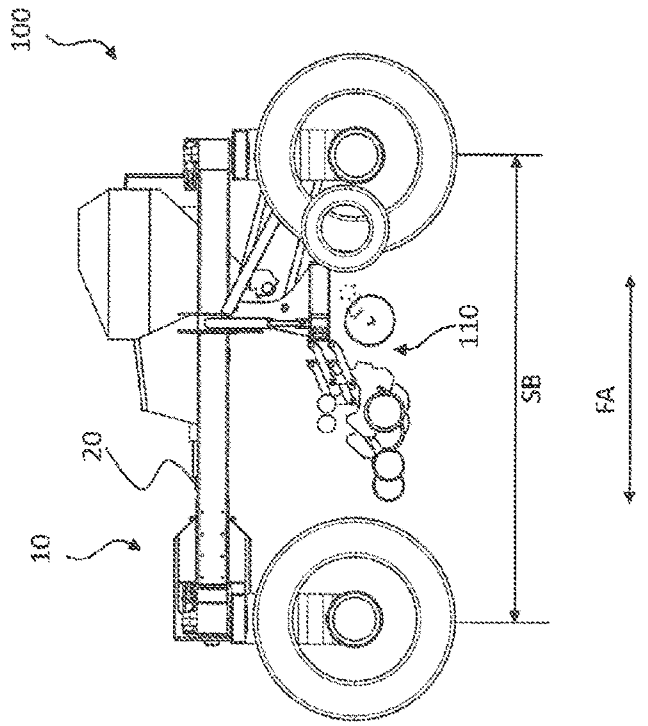

As is apparent in particular from FIGS. 3G and 3H, the chassis constructions 50 are mounted on edge regions of the frame construction in particular in such a manner that the frame construction 20 and/or the mounting devices 22 attached to the frame construction 20 have a height distance to a base surface (e.g. a contact area of the chassis constructions 50) which is at least 0.5 meters or at least 1.0 meters.

As is furthermore apparent from the exemplary embodiments, the carrier vehicle 10 forms in the working direction of travel FA a substantially U-shaped and/or V-shaped base shape. The carrier vehicle 10 furthermore forms transversely to the working direction of travel a substantially U-shaped and/or V-shaped base shape.

The chassis constructions are in each case steerable by means of a steering drive 60 (e.g. formed by a steering cylinder) about the vertically oriented axis 28, wherein in turn the control apparatus 150 is configured to provide actuating signals for the steering drive 60. It is thus possible that the carrier vehicle 10, or the machine combination 100, can be moved along a required and/or defined movement route, or driving route.

In order to be able to detect, for example, yaw or pitching movements or snaking movements of the carrier vehicle 10 and/or of the implement 110 mounted on the carrier vehicle 10, it can furthermore be provided according to the invention that the control apparatus 150 is signal-connected and/or signal-connectable to at least two position determination systems 170 arranged spaced apart from one another preferably transversely to the working direction of travel FA and is configured to determine a difference between a current position of the carrier vehicle 10 and/or an implement 110 coupled to the carrier vehicle 10 on agricultural land and a nominal position and provide actuating signals for the drive train and/or for the steering drive 60 based on a difference.

Wherein the position determination systems 170 can be assigned to the carrier vehicle 10 and/or the implement 110, or wherein at least one position determination systems 170 can be assigned to the carrier vehicle 10 and at least one position determination system 170 can be assigned to the implement 110.

Although the invention has been described with reference to specific exemplary embodiments, it is apparent to the person skilled in the art that various changes can be made and equivalents can be used as replacements without departing from the scope of the invention. A large number of modifications can additionally be made without departing from the associated scope. The invention should consequently not be restricted to the disclosed exemplary embodiments, but rather should comprise all the exemplary embodiments which fall into the scope of the enclosed claims. In particular, the invention also claims protection for the subject matter and the features of the subordinate claims independently of the claims referred to.

The invention claimed is:

1. An autonomous agricultural carrier vehicle, comprising:

a frame construction, having mounting devices, which are configured to carry and guide at least one agricultural implement;

at least two chassis constructions which are mounted on the frame construction;

a drive apparatus having a drive train which is coupled to the at least two chassis constructions and is configured to specify a driving speed; and a control apparatus and an environment sensor system which is signal-connected and/or signal-connectable to the control apparatus;

wherein the chassis constructions are mounted rotatably about at least 90° in each case about vertically oriented axes, and wherein the frame construction extends transversely to the working direction of travel and in the working direction of travel such that it forms a substantially rectangular, trapezoidal or triangular base shape;

wherein the autonomous agricultural carrier vehicle is coupled to an agricultural implement having at least one agricultural working tool, wherein the agricultural working tool is configured to perform an agricultural work process, wherein the implement has a maximum working width oriented transversely to the working direction of travel and the implement is arranged with respect to the carrier vehicle in such a manner that it has a minimum protrusion region with respect to at least two sides of the frame construction and/or the in each case furthest outwardly lying vertical axis, wherein the minimum protrusion region is at least 10% of the maximum working width, and wherein at least a portion of the agricultural implement is positioned vertically below the frame construction and laterally between opposing chassis constructions.

2. The carrier vehicle of claim 1, wherein:

the carrier vehicle can be moved in a working direction of travel or a direction of road travel as a function of a 90° rotation of the chassis constructions and/or the working direction of travel and the direction of road travel are substantially orthogonal to one another; and/or the frame construction has a longitudinal extent and the direction of road travel is substantially parallel to the longitudinal extent and the working direction of travel is substantially orthogonal to the longitudinal extent.

3. The carrier vehicle of claim 1, wherein:

the carrier vehicle has at least three chassis constructions and wherein the chassis constructions are arranged with respect to one another such that connecting lines from each vertically oriented axis to two of the respective vertically oriented axes at the next vertically oriented axis form a substantially rectangular, trapezoidal or triangular base shape.

4. The carrier vehicle of claim 1, wherein: that the frame construction comprises a main carrier construction and an articulation device and wherein the frame construction has at least four side parts which form a base shape which is substantially closed in the working direction of travel and transversely to the working direction of travel.

5. The carrier vehicle of claim 1, wherein the chassis constructions are mounted on edge regions of the frame construction in such a manner that:

the frame construction and/or the mounting devices attached to the frame construction have a height distance to a base surface which is at least 0.5 meters; and/or that the carrier vehicle forms in the working direction of travel a substantially U-shaped and/or V-shaped base shape; and/or that the carrier vehicle forms transversely to the working direction of travel a substantially U-shaped and/or V-shaped base shape.

6. The carrier vehicle of claim 1, wherein the frame construction comprises a main carrier construction and an articulation device and that at least two chassis constructions are mounted on the articulation device, wherein the articulation device is mounted pivotably on the main carrier construction by means of a pivot bearing oriented substantially in the working direction of travel.

7. The carrier vehicle of claim 6, wherein the pivot range of the articulation device is limited and/or can be limited with respect to the main carrier construction by means of a limiting apparatus.

8. The carrier vehicle of claim 1, wherein the chassis constructions are mounted in a height-adjustable manner on the frame construction in such a manner that a height equalization in the case of uneven ground is performed.

9. The carrier vehicle of claim 1, wherein at least one chassis construction is formed by:

a single wheel and/or a crawler track; and/or two wheels or two crawler tracks, wherein the two wheels or two crawler tracks have a twin arrangement and/or tandem arrangement.

10. The carrier vehicle of claim 1, wherein that the carrier vehicle comprises four chassis constructions and one frame construction, wherein the frame construction has a main carrier construction and an articulation device, and wherein at least two chassis constructions are mounted on the articulation device and wherein at least two chassis constructions are mounted on the main carrier construction at edge regions of the articulation device and the main carrier construction.

11. The carrier vehicle of claim 1, comprising at least four chassis constructions which:

are arranged in the working direction of travel relative to one another in such a manner that they form at least one wheelbase; and/or are arranged in the working direction of travel relative to one another in such a manner that they form at least two wheelbases which differ from one another; and/or are arranged transversely to the working direction of travel at least largely oppositely in relation to one another such that they form at least one track width; and/or are arranged transversely to the working direction of travel at least largely oppositely in relation to one another such that they have at least two track widths which preferably differ from one another.

12. The carrier vehicle of claim 1, wherein the carrier vehicle is configured:

to be moved autonomously in the direction of road travel and/or the working direction of travel; and/or to be moved by remote control in the direction of road travel and/or working direction of travel.

13. The carrier vehicle of claim 1, wherein the control apparatus is configured to provide actuating signals for the drive train based on signals provided by means of the environment sensor system, and wherein the environment sensor system is configured to detect obstacles and/or environment data and is arranged on the carrier vehicle in such a manner in order to detect a region upstream of the carrier vehicle in a working direction of travel and/or in order to detect a region upstream of the carrier vehicle in a direction of road travel.

14. The carrier vehicle of claim 1, wherein the at least two chassis constructions coupled to the drive train based on actuating signals provided by means of the control apparatus can be driven in a working direction of travel with the same driving speeds or with different driving speeds and/or can be driven in a direction of road travel with the same driving speeds or with different driving speeds or can be operated when idling.

15. The carrier vehicle of claim 1, wherein the at least one chassis construction is mounted in a freely rotatable manner about the vertically oriented axis with respect to a working direction of travel and/or with respect to a direction of road travel and/or the at least one chassis construction is actively steerable about the vertically oriented axis by means of a steering drive with respect to a working direction of travel and/or with respect to a direction of road travel, wherein the control apparatus is configured to provide actuating signals for the steering drive.

16. The carrier vehicle of claim 1, wherein:

at least one chassis construction is actively steerable by means of a steering drive about the vertically oriented axis with respect to a working direction of travel and/or with respect to a direction of road travel, wherein the control apparatus is configured to provide actuating signals for the steering drive;

wherein the control apparatus is signal-connected and/or signal-connectable to at least two position determination systems arranged spaced apart from one another preferably transversely to the working direction of travel and is configured to determine a difference between a current position of the carrier vehicle and/or an implement coupled to the carrier vehicle on agricultural land and a nominal position and provide actuating signals for the drive train and/or for the steering drive based on a difference.

17. The autonomous agricultural machine combination of claim 1, wherein the autonomous agricultural machine combination has, in a working direction of travel, a maximum working width defined by the implement and oriented transversely to the working direction of travel and has, in a direction of road travel, a minimum transport width defined by the carrier vehicle and oriented transversely to the direction of road travel, wherein the maximum working width is greater than the minimum transport width and at least twice as large as the minimum transport width.

18. The autonomous agricultural machine combination of claim 1, wherein the implement is arranged between at least two chassis constructions arranged consecutively in the working direction of travel in such a manner that the chassis constructions are rotatable about the vertically oriented axes at a pivot angle of at least 180°.

19. The autonomous agricultural machine combination of claim 1, wherein the at least one agricultural work tool, is mounted with its entire height extent below the frame construction.

20. The autonomous agricultural machine combination of claim 1, wherein a work process to be performed by the machine combination comprises agricultural material to be distributed and a storage container for storing and carrying the agricultural material to be distributed assigned to the carrier vehicle, wherein the working tools assigned to the implement are preferably formed as a distribution apparatus and are configured to distribute the agricultural material to be distributed in the required manner on an agricultural area, and wherein the storage container is operatively connected to the distribution apparatus by connecting lines.

21. The autonomous agricultural machine combination of claim 1, wherein at least one sensor of the environment sensor system is spatially and/or structurally assigned to the implement and is signal-connected and/or signal-connectable to the control apparatus, wherein the control device is configured to provide actuating signals for the drive train based on signals of the sensor assigned to the implement of the environment sensor system.

* * * * *